US010520637B2

(12) United States Patent
Li et al.

(10) Patent No.: US 10,520,637 B2
(45) Date of Patent: Dec. 31, 2019

(54) SYSTEM AND METHOD FOR TWO DIMENSIONAL GRAVITY MODELING WITH VARIABLE DENSITIES

(71) Applicant: CGG SERVICES SA, Massy (FR)

(72) Inventors: Xiong Li, Houston, TX (US); Barry Wiggins, Houston, TX (US)

(73) Assignee: CGG SERVICES SAS, Massy (FR)

( * ) Notice: Subject to any disclaimer, the term of this patent is extended or adjusted under 35 U.S.C. 154(b) by 317 days.

(21) Appl. No.: 15/111,228

(22) PCT Filed: Jan. 5, 2015

(86) PCT No.: PCT/IB2015/000093
§ 371 (c)(1),
(2) Date: Jul. 13, 2016

(87) PCT Pub. No.: WO2015/104633
PCT Pub. Date: Jul. 16, 2015

(65) Prior Publication Data
US 2016/0334537 A1   Nov. 17, 2016

Related U.S. Application Data

(60) Provisional application No. 61/926,842, filed on Jan. 13, 2014.

(51) Int. Cl.
*G01V 7/06* (2006.01)
(52) U.S. Cl.
CPC ...................................... *G01V 7/06* (2013.01)
(58) Field of Classification Search
CPC ....................................................... G01V 7/06
See application file for complete search history.

(56) References Cited

U.S. PATENT DOCUMENTS

2004/0172199 A1* 9/2004 Chavarria ................ G01V 1/28
702/14
2004/0201585 A1* 10/2004 Srivastava ............... G01V 7/00
345/423

OTHER PUBLICATIONS

Saltus, et al., "HYPERMAG, An Interactive, 2- and 2½-Dimensional Gravity and Magnetic Modeling Program: Version 3.5" pp. 1-41 (1995) (Year: 1995).*
Sari, et al. "Sediment thickness of the western Anatolia graben structures determined by 2D and 3D analysis using gravity data," Journal of Asian Earth Sciences 26 pp. 39-48 (2006) (Year: 2006).*
GM-SYS Gravity/Magnetic Modeling Software User's Guide Version 4.9 pp. 1-101 (2004) (Year: 2004).*

(Continued)

*Primary Examiner* — Rehana Perveen
*Assistant Examiner* — Steven W Crabb
(74) *Attorney, Agent, or Firm* — Patent Portfolio Builders PLLC

(57) ABSTRACT

Systems and methods for to two dimensional gravity modeling with variable densities are disclosed. The methods may include a method of modeling the density of a subsurface formation is disclosed. The methods may include generating a plurality of cells in a cross section of density values corresponding to a subsurface formation. The methods may further include assigning a density value to each cell. The methods may further include calculating a gravity effect for each cell based upon the density value. The methods may further include recording the gravity effect for each cell in a data structure.

20 Claims, 4 Drawing Sheets

(56) References Cited

OTHER PUBLICATIONS

Rao et al., "3D and 2½ D Modelling of Gravity Anomalies with Variable Density Contrast," Geophysical Prospecting 38, pp. 411-422 (1990). (Year: 1990).*
Trinks, Immo et al., "Gravity modelling based on small cells," EAGE 67th Conference & Exhibition, pp. 1-5 (Year: 2005).*
M. Talwani, et al.; "Rapid Gravity Computations for Two-Dimensional Bodies with Application to the Medocino Submarine Fracture Zone*"; Journal of Geophysical Research, vol. 64, No. 1; XP055206718; Jan. 1, 1959; pp. 49-59.
R. Blakely; "Potential Theory and Its Application to Gravity and Magnetic Problems, Chapter 3_9_11" in "Potential Theory in Gravity and Magnetic Applications"; Cambridge University Press, XP055207244; May 1, 1995; p. 55 paragraph 2, p. 57 paragraph 4; total pp. 461.
International Search Report in related International Application No. PCT/IB2015/000093, dated Aug. 20, 2015.
Written Opinion of the International Searching Authority in related International Application No. PCT/IB2015/000093, dated Aug. 20, 2015.
H.-J. Götze et al., "Application of Three-Dimensional Interactive Modelling in Gravity and Magnetics", Geophysics, Aug. 1988, vol. 53, No. 8, pp. 1096-1108.
S.N. Saha, "An Electromagnetic Analog Method for Computing Gravity and Magnetic Effects of Two-Dimensional Bodies", Geophysics, Oct. 1967, vol. XXXII, No. 5, pp. 833-852.
P. Stavrev et al., "Degrees of Homogeneity of Potential Fields and Structural Indices of Euler Deconvolution", Geophysics, Jan.-Feb. 2007, vol. 72, No. 1, pp. L1-L12.

\* cited by examiner

SYSTEM AND METHOD FOR TWO DIMENSIONAL GRAVITY MODELING WITH VARIABLE DENSITIES

CROSS-REFERENCE TO RELATED APPLICATION

This application claims the benefit under 35 U.S.C. § 119(e) of U.S. Provisional Application Ser. No. 61/926,842 filed on Jan. 13, 2014, which is incorporated by reference in its entirety for all purposes.

TECHNICAL FIELD

The present disclosure relates to gravity-based geophysical exploration, and, more particularly, to two dimensional gravity modeling with variable densities.

BACKGROUND OF THE INVENTION

Gravity Exploration Generally

Gravity modeling is a method of geophysical exploration that uses measurements of variations in the earth's gravitational field to estimate properties of the earth's subsurface. The gravity of the earth has an average value of 9.8 m/s$^2$, but it actually varies from 9.78 at the equator to 9.83 at the poles. Density variations of the earth's interior contribute to these gravity variations. Gravity exploration uses measurements of these gravity variations to study the interior of the earth.

The instrument used to measure gravity can be called a gravimeter or a gravity meter. An absolute gravimeter measures the absolute gravity value, for example, a value near 9.8 m/s$^2$. A relative gravimeter measures relative gravity, for example, the difference between a gravity value at one location and a gravity value at a base station. Almost all modern relative gravimeters use a metal or quartz spring as a gravity measurement device. In exploration applications, we rarely use absolute gravimeters.

Gravity measurements can be acquired, using a relative gravimeter, on land, on the sea surface (from a moving marine vessel), on the seafloor, or in air (on a flying aircraft, or on a satellite). A land gravity survey is typically static: gravity meters remain at a location for minutes while taking readings, and then move to the next location. Each location is called a station. Ideally, the distribution of land survey stations will be regular. In contrast, marine and airborne gravity surveys are dynamic: measurements are taken along pre-defined vessel and flight lines. Data are sampled along these lines using a certain sampling rate (in time or distance). In a typical land survey, one or more gravimeters may be used. In a typical marine or airborne survey, generally, only one gravimeter is used. The locations of land stations and line samplings may be defined by (X, Y, Z) coordinates, and these coordinates are routinely determined by GPS. Gravity readings and their (X, Y, Z) coordinates can be exported from a gravimeter system to a data storage device.

The variation in measured gravity values is attributable to a combination of many effects. For example, the measurement may be influenced by the gravitational attraction of the moon and the sun, or the drift effect due to an imperfection of the materials used to build a gravimeter. However, in gravity modeling, only the gravity effects due to density variations of the earth's interior are of interest. Thus, a systematic process is used to estimate or compute these unwanted effects and then remove them from the measured gravity. The remaining value is called a gravity anomaly.

Generally, the gravity unit of m/s$^2$ is too big for exploration applications. Thus, typically mGal is used as the unit of the gravity anomaly, where 9.8 m/s$^2$=980000 mGal. A typical peak-to-peak range of gravity anomalies in a gravity exploration project is about tens of mGal.

2D Gravity Modeling

Gravity modeling is one way to interpret gravity data. Interpretation is the process of delineating the subsurface structure and density distribution from observed gravity data. Gravity modeling typically includes building an initial subsurface structural (i.e., geometric) model that consists of layers and closed bodies, assigning initial density values to these layers and bodies, computing the gravity responses produced by the model, and then comparing the observed gravity anomaly and the calculated gravity responses. If the observed gravity anomaly and the computed gravity responses don't match, either the structural model, the density values, or both are edited. Subsequently, the calculated gravity responses are recalculated and again compared to the observed gravity anomaly. This process may be repeated so that the observed gravity and the calculated gravity match in, for example, a least squares sense. The end result is a final structural and density model that interprets the observed gravity reasonably well.

Gravity modeling may be called three dimensional (3D) gravity modeling if the observed gravity covers a surface and if a 3D subsurface model is built or used to interpret the observed gravity. Gravity modeling may be called two dimensional (2D) gravity modeling if observed gravity along a profile (or line or cross section) is used, or a 2D subsurface model is built or used to interpret the observed gravity. The present disclosure relates to 2D gravity modeling.

When observed gravity is used, the measurements are each associated to an (X, Y, Z) location along a profile. A profile can be a straight or curved line and may be selected in different ways. For example, a profile may connect several land stations together. Alternatively, a profile may include only one marine or airborne survey line. Further, a profile may be selected according to an anomaly pattern in a gridded result of station or line data. One principle for a proper selection is that a profile should be perpendicular to a major known geological strike direction. After selecting a profile, observed gravity values are extracted along the profile using interpolation. Further, a profile may use an existing seismic profile. A seismic profile may have associated observed gravity, or observed gravity may be extracted from a gridded result.

Assignment of initial density values may be based on density logging in wells, density values of rock or core samples, or knowledge about the lithology, for example, rock types of the layers and bodies. Common density values of many rocks are well known.

2D Gravity Modeling with Variable Densities 2D gravity modeling is conducted routinely on a desktop or laptop computer. Thus, efficient computational algorithms are desirable. However, current solutions for 2D gravity modeling with variable densities suffer from inefficient computational algorithms.

For example, one solution to 2D gravity modeling with variable densities is to derive a mathematical formula for the gravity effect of a 2D body with a polygonal cross-section and with variable densities. Formulae have been published for densities varying either horizontally or vertically, but only in a certain form (exponential or polynomial). Other algorithms can process densities varying in both horizontal and vertical direction, but the density contrast must be in a specific polynomial function, and a computation of the gravity effect not at the origin of the coordinate system requires either a coordinate transformation or a solution transformation. In short, the density function form is restrictive and the computation is cumbersome.

An indirect solution is to discretize the subsurface model into smaller bodies. Existing mathematical formulae may be used to compute the gravity effects of each small body, e.g., with a rectangular cross section, but these formulae are complex, involving, for example, logarithms, arctangents and square roots.

Thus, a more efficient computation of gravity responses is required. The present disclosure includes system and methods directed towards more efficient 2D gravity modeling.

SUMMARY

A method of modeling the density of a subsurface formation is disclosed. The method includes generating a plurality of cells in a cross section of density values corresponding to a subsurface formation, and assigning a density value to each cell. The method further includes calculating a gravity effect for each cell based upon the density value, and recording the gravity effect for each cell in a data structure.

A method of modeling the density of a subsurface formation is disclosed. The method includes generating a plurality of cells in a cross section of density values corresponding to a subsurface formation, and assigning a density value to each cell. The method may further include using a line mass to approximate each cell based upon the density value and a size of the cell. The method may finally include determining a gravity effect for each cell based on the line mass.

A gravity modeling system comprising a computing system is disclosed. The computing system is configured to generate a plurality of cells in a cross section of density values corresponding to a subsurface formation, and to assign a density value to each cell. The computing system is further configured to calculate a gravity effect of each cell based upon the density value, and to record the gravity effect of each cell in a data structure.

A non-transitory computer-readable medium including computer-executable instructions carried on the computer-readable medium is disclosed. The instructions, when executed, cause a processor to generate a plurality of cells in a cross section of density values corresponding to a subsurface formation, and to assign a density value to each cell. The instructions further cause a processor to calculate a gravity effect of each cell based upon the density value, and to record the gravity effect of each cell in a data structure.

BRIEF DESCRIPTION OF THE DRAWINGS

For a more complete understanding of the present disclosure and its features and advantages, reference is now made to the following description, taken in conjunction with the accompanying drawings, in which like reference numbers indicate like features and wherein.

DETAILED DESCRIPTION

The present disclosure relates to systems and methods for two dimensional gravity modeling with variable densities. Gravity measurements are generated for an array of points over an area of exploration. Generally, data corresponding to a cross section of the earth in the area of exploration, including a subsurface structural model and associated density values, is divided into cells. Each cell is assigned a density value and consequently has a gravity effect (i.e., a calculated gravity value) at each gravity station. The resources consumed by calculating the gravity effects of each cell may be reduced relative to prior techniques by use of a lookup table technique, a line mass technique, or a combination of these two techniques. Embodiments of the present disclosure and its advantages are best understood by referring to FIGS. 1 through 4 of the drawings, like numerals being used for like and corresponding parts of the various drawings.

Figure 1:
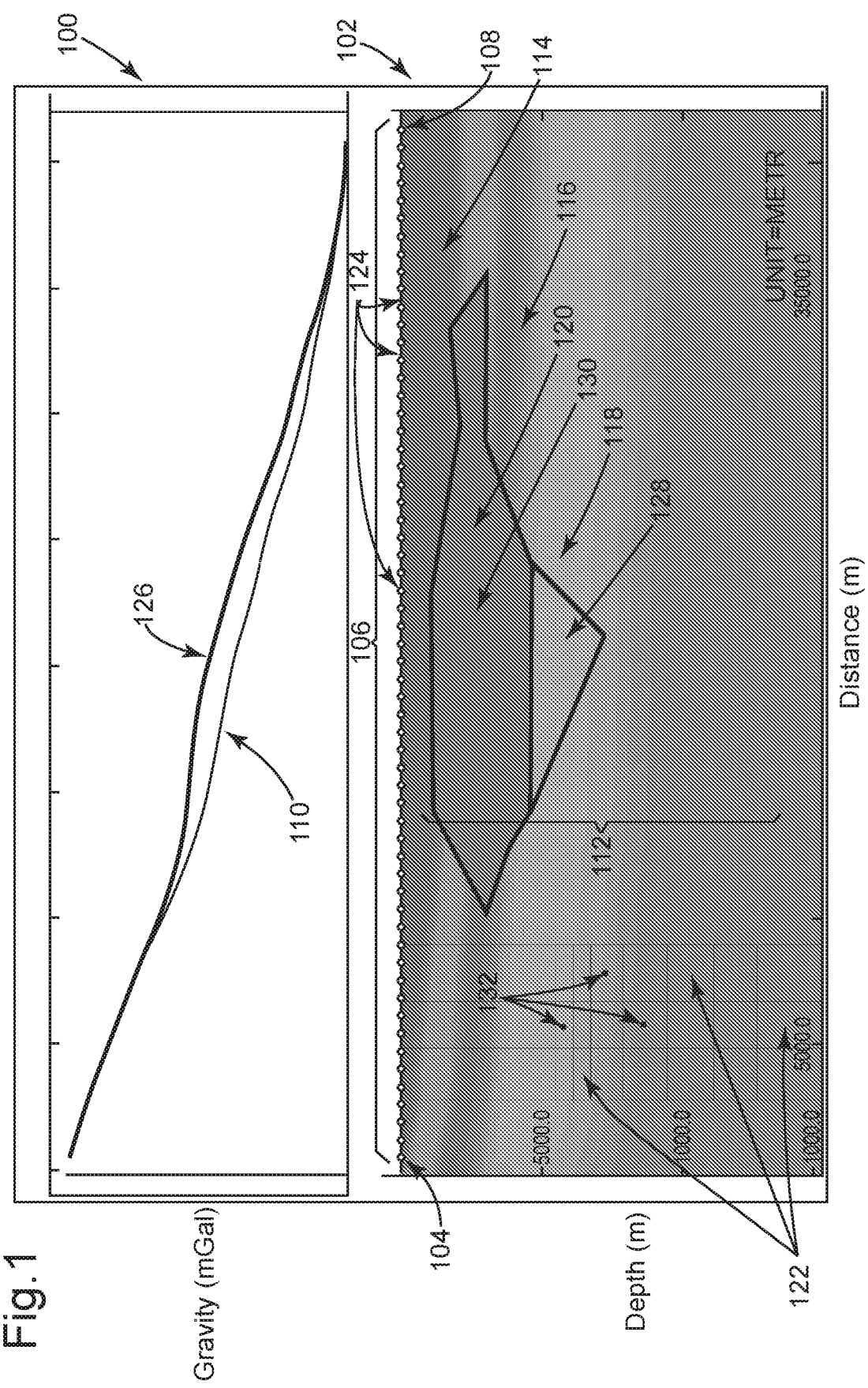
FIG. 1 illustrates a graph of an exemplary calculated gravity response and observed gravity anomaly and corresponding density values in accordance with some embodiments of the present disclosure.

Two dimensional gravity modeling may require selection of profile 106 from an area of exploration, as shown, for example, in FIG. 1. Profile 106 is typically selected to be parallel to a set of locations of gravity stations 124, but profile 106 may also be selected along any arbitrary pathway. Profile 106 begins at starting point 104 and ends at termination point 108. Thus, profile 106 may be straight between starting point 104 and termination point 108, or may follow a curved pathway. Profile 106 may be selected based on topology, the locations of gravity stations 124, subsurface formations of interest, or any other suitable characteristic.

Profile 106 may be used to define cross section 102. Cross section 102 may include density values 112 and observed gravity anomaly 110 associated with the geological features beneath profile 106. Cross section 102 typically includes information associated with a two dimensional area beneath profile 106, and substantially perpendicular to the surface of the earth.

Polygonal bodies 130, as shown, for example, in FIG. 1, may be defined within cross section 102. Polygonal bodies 130 may correspond to areas of similar density with cross section 102. For example, polygonal body 130 may correspond to a type of rock. Polygonal bodies 130 may be created based upon a seismic profile, geological cross-section, a purely free-hand drawing according to a user's knowledge about structure of the study area, any suitable alternative source of information, or any combination of these sources may be used.

In general, an initial set of density values 112 may be created by assigning density values to polygonal bodies 130. The initial density values 112 can be created with a variety of techniques. For example, an initial variable or constant density model can be assumed for an entire density volume, or any portion of a density volume. More specifically, initial density values 112 can be derived from an initial structural model, seismic velocity volume data, well logging results, rock or core samples, or any other suitable source of initial density values 112. If a constant density model is selected, each location within a polygonal body will have the same density value. If an initial variable density model is selected, initial density values may vary within polygonal bodies 130. For example, initial density values 112 may be derived using a polynomial function. Density values 112 may be contained in a data structure, a database, or any other suitable storage configuration that allows access to density values 112.

In some embodiments, after cross section 102 is selected, a two dimensional image of cross section 102 is created. As shown, for example, in FIG. 1, an image may include a graph 100 of observed gravity anomaly 110. Such an image may also include polygonal bodies 130. In such an image, geological features may be identifiable as contiguous areas of similar densities. For example, strata 114, 116, and 118, and intrusion 120 may be illustrated as groupings of commonly colored cells 122.

In some embodiments of the invention, after cross section 102 is selected, cross section 102 is divided into cells 122, each with an assigned density value 112. The configuration of cells 122 may be called the discretization of cross section 102. Discretization refers to converting a continuous model into discrete counterparts. Discretization of cross section 102 may include the selection of the dimensions of each cell 122. Discretization may be selected such that cells 122 are any polygonal shape. For example, cells 122 may be rectangles. Each cell 122 may be of different dimensions from other cells 122. Each cell 122 may assigned a density value based upon density values 112 associated with polygonal bodies 130. Alternatively, each cell 122 may be assigned a density value based directly on density value 112. The level of discretization may be chosen in view of the anticipated or observed subsurface material properties. For example, if significant density or formation changes are observed or anticipated, the size of cells 122 may be smaller to provide enhanced resolution of density differences. Additionally, the level of discretization may be selected in view of the required computational efficiency or model accuracy required for the specific application. Cells 122 may be color coded, shaded, or otherwise distinguished to correspond to the density values of cells 122.

After cells 122 are created in cross section 102, calculated gravity response 126 may be generated based upon the location and density assigned to each cell 122. Calculated gravity response 126 may be generated using a lookup table technique, a line mass technique, or a combination of the two techniques. Each cell 122 contributes a gravity effect to each point along calculated gravity response 126. In some embodiments, the gravity effects due to each cell 122 are combined into calculated gravity response 126. The gravity effects corresponding to a particular gravity station 124 may be summed to generate a calculated gravity value for that gravity station 124. The calculated gravity values at all stations may be plotted on a single graph to produce calculated gravity response 126.

Depending on the accuracy of the initial density values 112, calculated gravity response 126 may differ from observed gravity anomaly 110. When calculated gravity response 126 is sufficiently similar to observed gravity anomaly 110, the two curves are matched. Matching between calculated gravity response 126 and observed gravity anomaly 110 depends, in part, on density values 112. Matching may be calculated quantitatively or estimated through a visual inspection of the properties of calculated gravity response 126 and observed gravity anomaly 110.

In order to increase matching between calculated gravity response 126 and observed gravity anomaly 110, in some embodiments, one or more density changes may be made to density change region 128 in cross section 102. A density change can be made, for example, to increase the quality of the match between calculated gravity response 126 and observed gravity anomaly 110. Alternatively, the density change may be based on a new survey of the region, a change in reservoir properties, or any other suitable reason. Density change region 128 may be implemented by adjusting a vertex of a polygonal body, for example polygonal body 130, such that polygonal body 130 includes more or different cells 122 after the adjustment. Alternatively, any other means of specifying a group of contiguous cells 122 may be used to define density change region 128. Density change region 128 can include any contiguous portion of cross section 102, for example, density change region 128 in strata 118. Cells 122 in density change region 128 may be assigned a new density value or may be assigned a relative change in density. For example, a density change may assign cells 122 in density change region 128 a new density similar to an adjacent group of cells 122, for example cells 122 in polygonal body 130 in intrusion 120. However, a density change may be made to any group of cells 122 for any suitable reason. Typically, density change region 128 includes one or more cells 122. Cells 122 affected by the density change may be identified. Further, the density change to altered cells 122 may be implemented by multiplying the density values of cells 122 by a relative density change value, or by replacing the density of cells 122 with new density values.

Figure 2:
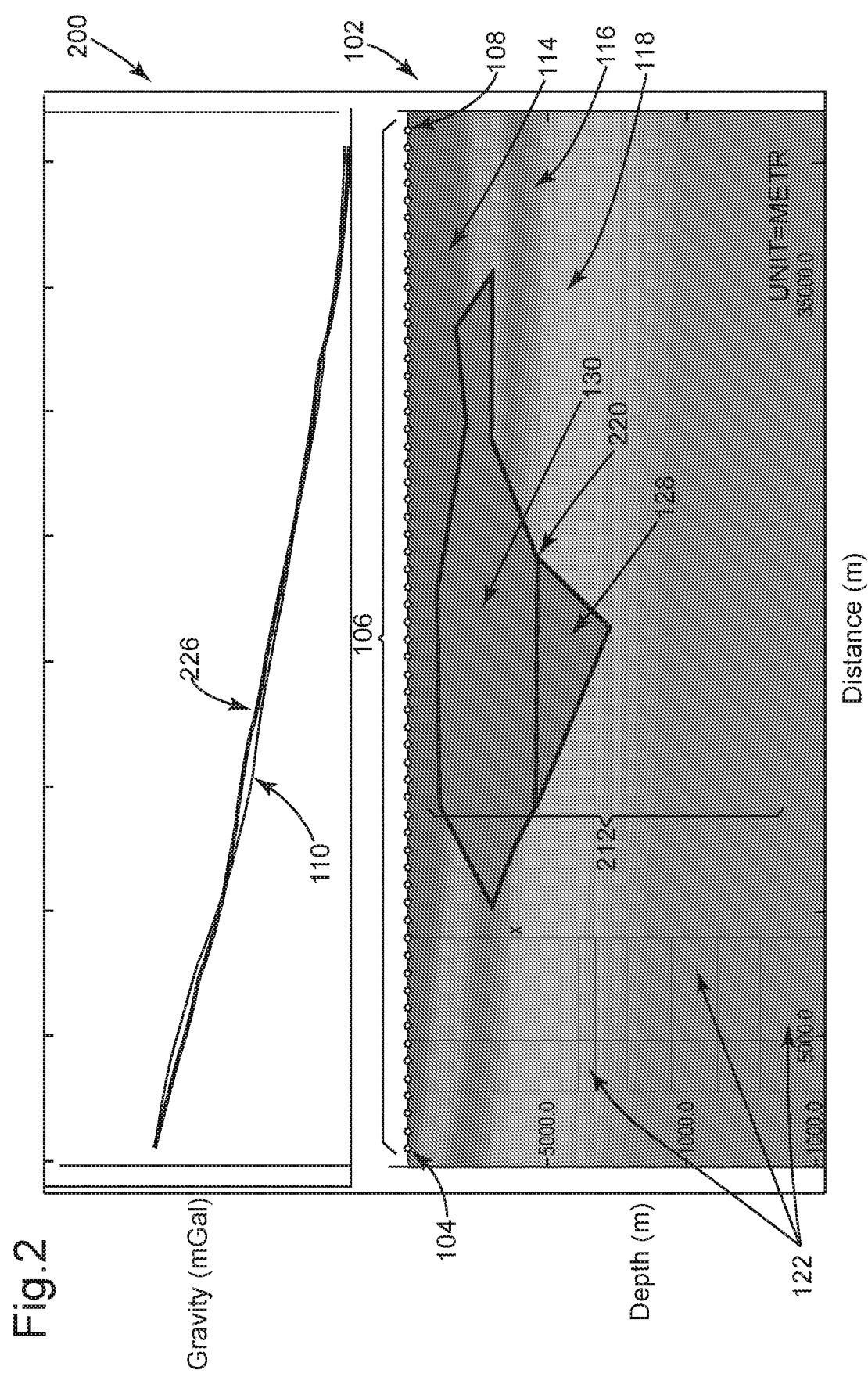
FIG. 2 illustrates a graph of an exemplary recalculated gravity response and observed gravity anomaly and corresponding density values in accordance with some embodiments of the present disclosure.

In some embodiments of the disclosure, after one or more density changes have been made, calculated gravity response 126 may be recalculated in response to the updated density values 212, as shown in, for example, FIG. 2. After calculated gravity response 126 has been modified by applying a density change in a region of cross section 102, the values may be displayed in a new graph 200. For example, FIG. 2 illustrates graph 200 of exemplary recalculated gravity response 226, observed gravity anomaly 110, and updated density values 212 in accordance with some embodiments of the present disclosure. For example, updated intrusion 220 includes cells 122 in both polygonal body 130 and cells 122 in density change region 128. If recalculated gravity response 226 is not sufficiently well matched with observed gravity anomaly 110, a new density change may be implemented to increase the match.

According to embodiments of the present disclosure, the gravity effects of each cell 122 at each gravity station 124 may be calculated using a lookup table technique, a line mass technique, or a combination of the two techniques.

In some embodiments, a lookup table technique may be selected to create calculated gravity response 126, as shown in, for example, FIG. 1. A gravity effect of each cell 122 may be computed with respect to each gravity station 124. The gravity effect at each station due to a cell may be calculated with reference to density values 112, or may be calculated assuming a unit density for each cell, or any other appropriate distribution of densities. The gravity effects may be stored in a "lookup table," a data structure, a database, or any other suitable storage configuration that allows access to the gravity effects. For example, the gravity effects may be stored in a two dimensional matrix with one row for each cell 122 and one column for each gravity station 124. The processing required to create the lookup table can be computationally intensive. However, the lookup table typically needs to be generated only once or very few times for a given cross section 102.

If, for example, cell 122 is a rectangle, the gravity effect at a particular gravity station 124 is calculated using equation (1):

$$g = 2G\rho\left\{d_b(\theta_3 - \theta_4) - d_t(\theta_2 - \theta_1) + r_{min}\ln\left(\frac{r_1 r_3}{r_2 r_4}\right) + (r_{max} - r_{min})\ln\left(\frac{r_4}{r_1}\right)\right\} \quad (1)$$

Where:
G=0.00667, the universal gravitational constant $$\theta_1 = \tan^{-1}\left(\frac{r_{max}}{d_t}\right) \quad \theta_2 = \tan^{-1}\left(\frac{r_{min}}{d_t}\right)$$

$$\theta_3 = \tan^{-1}\left(\frac{r_{min}}{d_b}\right) \quad \theta_4 = \tan^{-1}\left(\frac{r_{max}}{d_b}\right)$$

$$r_1 = \sqrt{r_{max}^2 + d_t^2} \quad r_2 = \sqrt{r_{min}^2 + d_t^2}$$

$$r_3 = \sqrt{r_{min}^2 + d_b^2} \quad r_4 = \sqrt{r_{max}^2 + d_b^2}$$

$r_{max}$ and $r_{min}$ are, respectively, the maximum and minimum horizontal displacements of a cell vertex from gravity station 124, $\theta_1, \theta_2, \theta_3, \theta_4$ are, respectively, the angles of the deviations from horizontal between each vertex of cell 122 and gravity station 124, $r_1, r_2, r_3, r_4$ are, respectively, the distances between each vertex of cell 122 and gravity station 124, and $d_t$ and $d_b$ are vertical displacements between the top and bottom of cell 122, respectively, and gravity station 124.

In some embodiments of the disclosure, recalculating calculated gravity response 126 may be accomplished by recalculating each gravity effect with reference to the lookup table. When a density value of one or more cells 122 is changed, the gravity effects for that cell may be recalculated by adjusting the gravity effect of the cell proportionately to the density change. If, for example, the lookup table was originally calculated based on a unit density for each cell, the updated gravity effect of a cell will be the product of the new density and the gravity effect contained in the lookup table. Alternatively, an updated table containing updated gravity effects may be created by duplicating the original lookup table and updating the entries of one or more changed cells 122. The gravity effects may then be summed for each gravity station 124 to create recalculated gravity response 226, as shown in FIG. 2. As previously discussed, the creation of the lookup table may be computationally intensive. By contrast, updating the gravity effects in the lookup table in response to a density change typically requires less computing power.

In some embodiments, a line mass technique may be selected to create calculated gravity response 126, as shown in, for example, FIG. 1. In such embodiments, calculated gravity response 126 may be calculated by mathematically concentrating the mass of a particular cell 122 to a single point at the center of cell 122, referred to as line mass 132. A gravity effect of line mass 132 may be calculated or approximated with respect to each gravity station 124 for each cell 122 with reference to equation (2):

$$g = \frac{2Gm}{(z_Q - z_P)\left[1 + \left(\frac{x_Q - x_P}{z_Q - z_P}\right)^2\right]} \quad (2)$$

Where:
G=0.0667, the universal gravitational constant,
x is the horizontal axis and the z-axis is positive down.
gravity station 124 has coordinates $(x_p, z_p)$ in meters.
the center point of the 122 has coordinates $(x_q, z_q)$ in meters.
$\Delta x$ and $\Delta z$ are the height and width of cell 122, respectively.
$\rho$ is the density of cell 122 in g/cm³.
$m = \Delta x \Delta z \rho$, the mass per unit length The gravity effects due to each line mass 132 are combined into calculated gravity response 126. The gravity effect of each line mass 132 may be calculated with reference to each gravity station 124 according to equation (2), and then gravity effects corresponding to a particular gravity station 124 may be summed to generate a calculated gravity value for that gravity station 124. The calculated gravity values may be plotted on a single graph to produce calculated gravity response 126. When a density change is made, for example, density change region 128, the gravity effects of line mass 132 for each cell 122 may be recalculated for each gravity station 124. The updated gravity effects may then be summed to create recalculated gravity response 226, as shown, for example, in FIG. 2.

In some embodiments of the disclosure, the decision to use either a lookup table, line mass, or a combination of the two techniques to create calculated gravity response 126 may depend on a variety of factors. Specifically, the decision may depend on, for example, the available computing resources, the desired accuracy of the model, the geology of the subsurface features beneath the exploration area, or any other suitable factor. Further, the two techniques may be combined by using different techniques to create recalculated gravity response 226 for successive changes to density values 112. Alternatively, the two techniques may be combined by calculating the gravity effects for a portion of cells 122 using one technique, while using the second technique for the remainder of cells 122. Further the techniques may also be combined by calculating a gravity effect of cells 122 on some of gravity stations 124 using one technique, while using the other technique to calculated the gravity effects of cells 122 on the remaining gravity stations 124.

In some embodiments of the invention, when a sufficient number of density changes have been implemented such that recalculated gravity response 226 and observed gravity anomaly 110 match, density values 112, polygonal bodies 130 and cells 122 may be exported into a data structure, a database, or any other suitable storage configuration that allows access to the results.

Normally, in gravity exploration, a gravity meter is used to generate gravity measurement data. However, the present disclosure can also be applied to gravity gradient measurement data. A gravity gradient is a directional derivative of gravity data. In two dimensions, typically a horizontal and a vertical gradient are calculated. A gravity effect of each cell 122 may be calculated with reference to each gravity station 124, by using a look-up table technique, a line mass technique, or a combination of the two techniques. Calculated gravity response 126 may be calculated by summing the gravity effects for each gravity station 124. Subsequently, a horizontal gravity gradient is obtained by computing the horizontal derivative of calculated gravity response 126, and the vertical gravity gradient is obtained by computing the vertical derivative of calculated gravity response 126. The calculated gravity gradient values may then be compared to observed gravity gradient data. Modeling of gravity and gravity gradient components may be performed separately or together. The choice between modeling gravity values or gravity gradient values may depend on, for example, the availability of observed gravity or observed gravity gradient data, or any other suitable factor.

Figure 3:
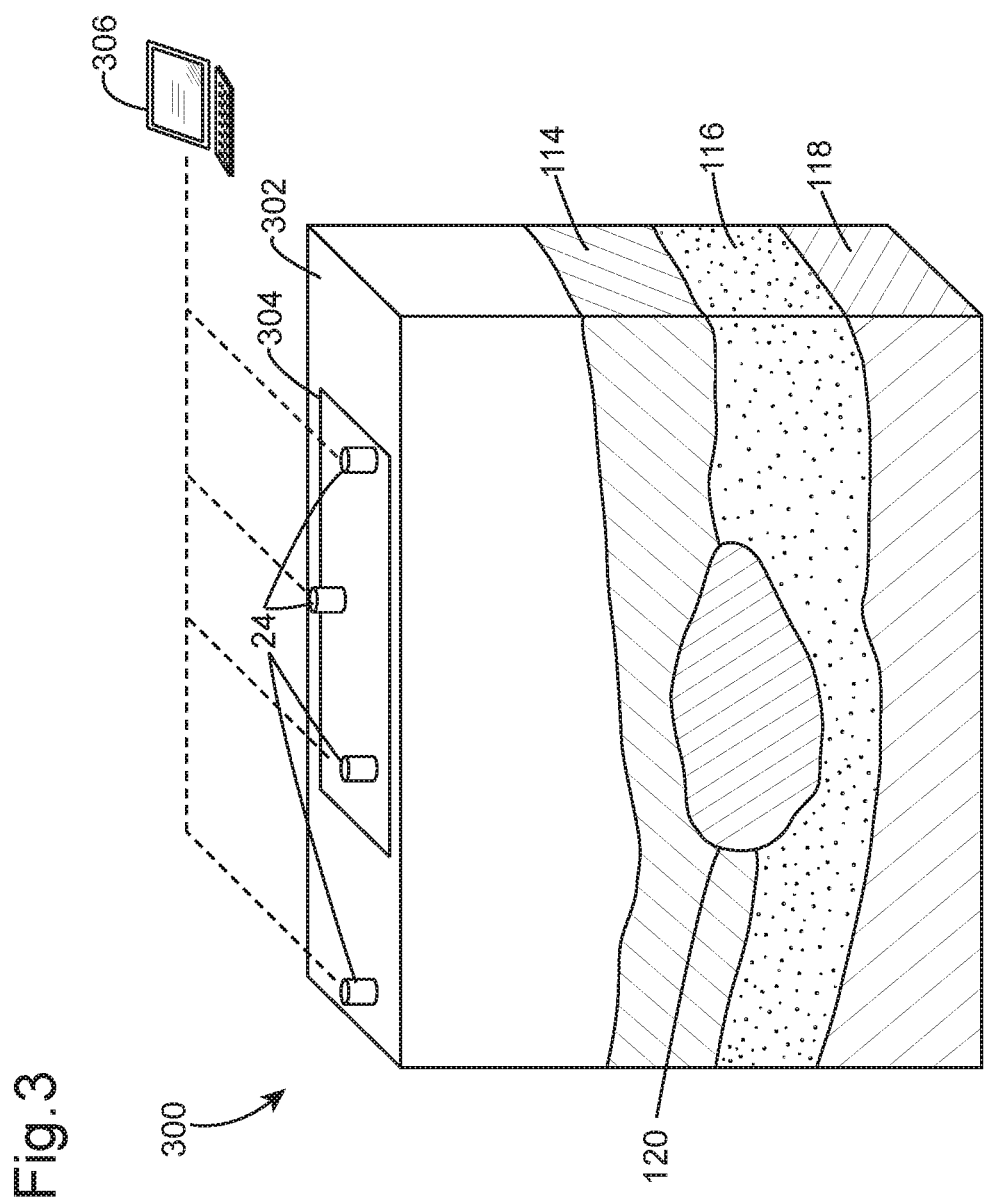
FIG. 3 illustrates an elevation view of an exemplary gravity exploration system configured to produce imaging of the earth's subsurface geological structure in accordance with some embodiments of the present disclosure.

FIG. 3 illustrates an elevation view of an exemplary gravity exploration system 300 configured to produce imaging of the earth's subsurface geological structure in accordance with some embodiments of the present disclosure. Gravity data may be acquired and processed to produce images of subsurface features. The images produced by system 300 allow for the evaluation of subsurface geology. System 300 may include one or more gravity stations 124 located within a predetermined exploration area 304. For land based surveys, gravity stations 124 may include a gravity meter in a fixed location, while for marine or air based surveys, gravity stations 124 may include data acquired with a gravity meter in motion and associated with an (X, Y, Z,) location. Exploration area 304 may be any defined area selected for survey or exploration. A survey of exploration area 304 may include the collection of gravity measurements from an array of gravity stations 124.

System 300 may include one or more gravity stations 124. Gravity station 124 may be generated by a gravity meter, a gravimeter, a gravity gradiometer, or any gravity observation mechanism. Gravity station 124 may include any type of device capable of performing absolute gravity measurements, relative gravity measurements or other suitable gravity measurements. For example, gravity station 124 may include a torsion gravimeter, a spring gravimeter, a zero-length spring gravimeter, or any other suitable instrument for determining gravity measurements. In some embodiments, gravity station 124 is located on or proximate to surface 302 of the earth within exploration area 304. In some embodiments, gravity station 124 is located on a moving object, such as a plane or ship. In embodiments where gravity meters are in motion between measurements, each location at which a gravity measurement is generated may be referred to as gravity station 124. A particular gravity station 124 is typically spaced apart from other adjacent gravity stations 124. Further, a positioning system, such as a global positioning system (GPS), may be utilized to provide data associated with the location of gravity stations 124.

Normally, the subsurface geology will include multiple geophysical strata, for example strata 114, 116, and 118. The subsurface geology may also include one or more intrusions, for example, intrusion 120. Features of the subsurface geology, for example strata 114, 116 and 118, and intrusion 120, may be referred to as structures. The density of a structure will vary according to the type of material in the structure. For example, in oil and gas exploration, some strata may include, for example, rock, oil, gas, water. A typical instruction may include, for example, a salt body. Density is defined in units of mass (or weight) per unit volume (g/cm$^3$).

Gravity meters may be communicatively coupled to one or more computing devices 306. One or more gravity meters transmit raw gravity data via a network to computing device 306. A particular computing device 306 may transmit raw gravity data to other computing devices 306 or other sites via a network. Computing device 306 performs gravity data processing on the raw gravity data to prepare the data for interpretation. Computing device 306 may include any instrumentality or aggregation of instrumentalities operable to compute, classify, process, transmit, receive, store, display, record, or utilize any form of information, intelligence, or data. For example, computing device 306 may comprise a personal computer, a storage device, or any other suitable device and may vary in size, shape, performance, functionality, and price. Computing device 306 may include random access memory (RAM), one or more processing resources such as a central processing unit (CPU) or hardware or software control logic, or other types of volatile or non-volatile memory. Additional components of computing device 306 may include one or more disk drives, one or more network ports for communicating with external devices, various input and output (I/O) devices, such as a keyboard, a mouse, and a video display. Computing device 306 may be configured to permit communication over any type of network, such as a wireless network, a local area network (LAN), or a wide area network (WAN) such as the Internet.

In some embodiments, a two dimensional exploration area 304 is associated with observed gravity anomaly 110 and density values 112. Exploration area 304 represents a contiguous region on surface 302. Gravity stations 124 include associated observed gravity anomaly 110. Observed gravity anomaly 110 typically comprises observed gravity measurements for an array of points in exploration area 304. However, observed gravity anomaly 110 may also comprise measurements of particular points within exploration area 304, or any subset of exploration area 304.

Figure 4:
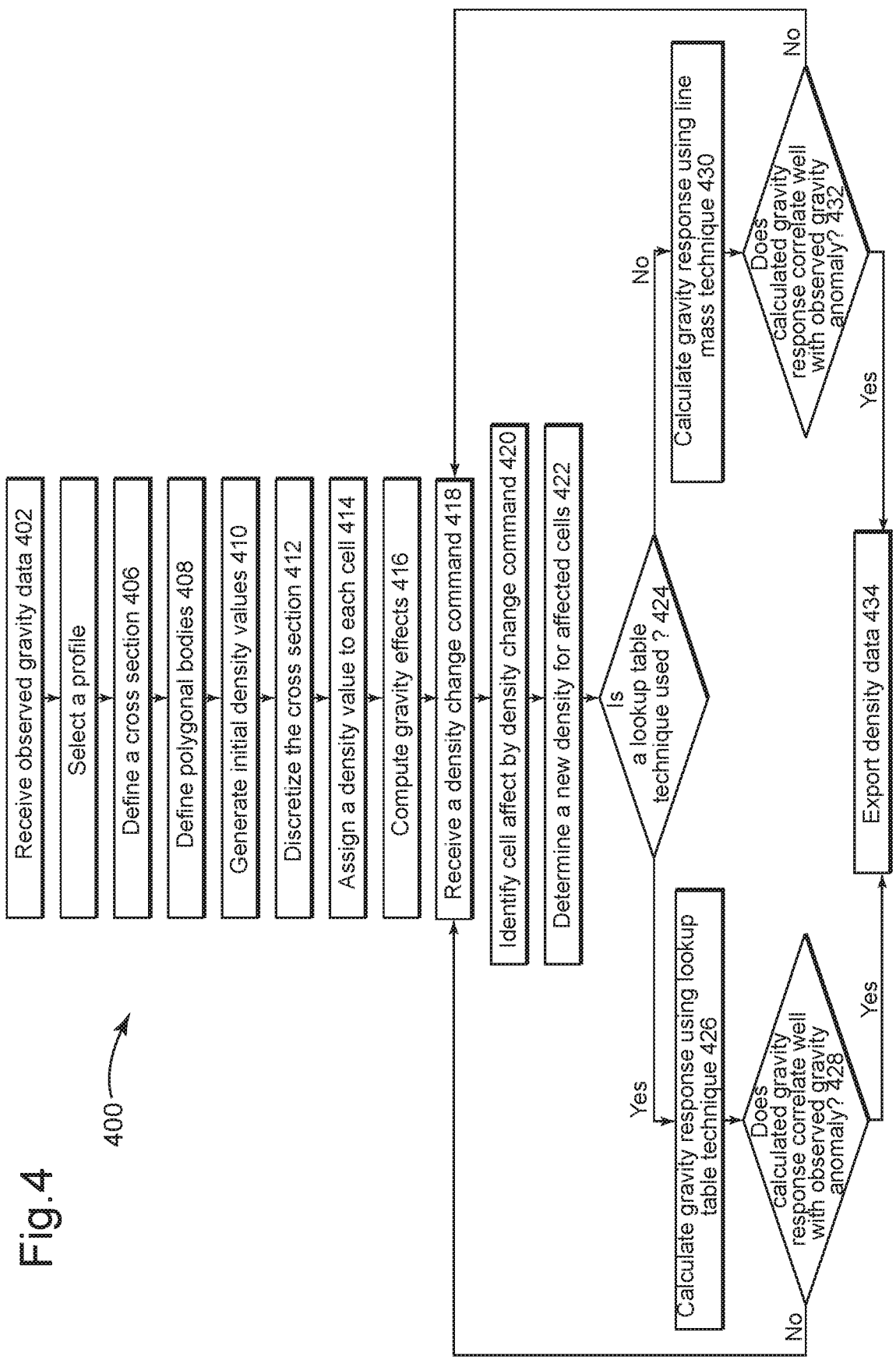
FIG. 4 illustrates a flow chart of an example method for two dimensional gravity modeling with variable densities in accordance with some embodiments of the present disclosure.

FIG. 4 illustrates a flow chart of an exemplary method 400 for two dimensional gravity modeling with variable densities in accordance with some embodiments of the present disclosure. The steps of method 400 are performed by a user, various computer programs, models configured to process or analyze gravity data, or any combination thereof. The programs and models include instructions stored on a computer readable medium and operable to perform, when executed, one or more of the steps described below. The computer readable media includes any system, apparatus or device configured to store and retrieve programs or instructions such as a hard disk drive, a compact disc, flash memory, or any other suitable device. The programs and models are configured to direct a processor or other suitable unit to retrieve and execute the instructions from the computer readable media. Collectively, the user or computer programs and models used to process and analyze gravity data may be referred to as a "computing system."

Method 400 begins at step 402 where the computing system receives gravity measurement data. Gravity measurement data may be collected by, for example, gravity meters. Gravity meters may create gravity stations 124, shown with reference to FIG. 1. Gravity stations 124 may be located in exploration area 304, as shown in FIG. 3. The gravity measurement data may be transmitted to the computing system by any suitable data transmission means.

At step 404, the computing system selects profile 106. Profile 106 is typically selected to be parallel to a line connecting a set of locations of gravity stations 124, but profile 106 may also be selected along any arbitrary pathway. Profile 106 begins at starting point 104 and ends at termination point 108. Thus, profile 106 may be straight between starting point 104 and termination point 108, or may follow a curved pathway. Profile 106 may be selected based on topology, the locations of gravity stations 124, subsurface formations of interest, or any other suitable characteristic.

At step 406, the computing system defines cross section 102. Cross section 102 may be defined by selecting profile 106 beginning at starting point 104 and ending at a termination point 108, as seen, for example, in FIGS. 1 and 2. Cross section 102 may be selected to correspond to a subsurface formation of interest.

At step 408, the computing system generates polygonal bodies 130. Polygonal bodies 130, as shown, for example, in FIG. 1, may be defined within cross section 102. Polygonal bodies 130 may correspond to areas of similar density with cross section 102. For example, polygonal body 130 may correspond to a type of rock. Polygonal bodies 130 may be created based upon a seismic profile, geological cross-section, a purely free-hand drawing according to a user's knowledge about structure of the study area, any suitable alternative source of information, or any combination of these sources may be used.

At step 410, the computing system generates initial density values 112. Initial density values 112 can be created with a variety of techniques. For example, an initial variable or constant density model can be assumed for an entire density volume, or any portion of a density volume. More specifically, density values 112 can be derived from seismic velocity volume data, well logging results, rock or core samples, or any other suitable source of initial density values 112. Initial density values 112 may be assigned to each polygonal body 130.

At step 412, the computing system discretizes cross section 102. Discretizing cross section 102 includes dividing cross section 102 into cells 122, shown, for example, in FIGS. 1 and 2. Discretization may be selected to create cells 122 of particular sizes. Discretization may be selected based upon anticipated or measured subsurface physical properties, the level of accuracy required in the model, the processing power of the computing system, or any other suitable factor.

At step 414, the computing system may assign a density value to each cell 122 based upon the initial density values 112. Each cell 122 is assigned a single density value. A graphical representation of cross section 102 may display the assigned density values by color coding, shading, or otherwise distinguishing cells 122. Exemplary density data 112 is shown for strata 114, 116, and 118, and intrusion 120, illustrated in FIGS. 1 and 2.

At step 416, the computing system calculates the gravity effects of each cell 122 on each gravity station 124, shown, for example, in FIG. 1. The gravity effects may be calculated with reference to, for example, equations 1 and 2. Additionally, a lookup table may be created by calculating the gravity effects of each cell 122 and storing the effects in a data structure, a database, or any other suitable storage configuration that allows access to the gravity effects. The lookup table may be calculated by assuming a unit density for each cell 122. The gravity effects of each cell on each gravity station 124 may be summed to create calculated gravity response 126, displayed graphically in FIG. 1. Calculated gravity response 126 may be poorly matched with observed gravity anomaly 110, shown, for example, in FIG. 1.

At step 418, the computing system receives a command to change the density of density change region 128. Density change region 128, shown in FIG. 1, may be selected based, for example, on improved or altered measurement data, or for any other suitable reason. Further, density change region 128 may encompass any portion of cross section 102.

At step, 420, the computing system identifies cells 122 affected by the command. Density change region 128 may encompass any portion of cells 122 in cross section 102, including one or more adjacent cells 122, as shown, for example, in density change region 128 in FIG. 1.

At step 422, an updated density is determined for each identified cell 122. A density change to altered cell 122 may be implemented by multiplying the density value of cell 122 by a relative density change value, or by replacing the density of the cell 122 with a new density value.

At step 424, the computing system selects a gravity calculation algorithm. A lookup table technique may be used, for example. Alternatively, a line mass technique may be used. The selection of a gravity calculation algorithm may be based upon any suitable characteristic, including, for example, the available computing resources, the desired accuracy of the model, or the geology of the subsurface features beneath the exploration area.

If, at step 426, a lookup table technique is chosen, the method proceeds to step 424 where the computing system recalculates calculated gravity response 126 using a lookup table technique. The gravity effects of each cell 122 may be calculated with reference to equation (1). The gravity effects may be modified by adjusting the gravity effects proportionately to the density change to create an updated gravity effect for cell 122. The modified gravity effects of each cell 122 are summed for each gravity station 124 to create recalculated gravity response 226.

At step 428, the computing system determines whether recalculated gravity response 226 matches sufficiently well with the observed gravity anomaly 110. The degree of match may be computed quantitatively. If sufficient match is found, the computing system may export the final data. If sufficient match is not found, another density change command may be implemented.

If, at step 424, a line mass technique was selected, the method proceeds to step 430 where the computing system recalculates calculated gravity response 126 using a line mass technique. Line mass 132 of cells 122 is created by concentrating the surface mass of cell 122 into a single point in the center of cells 132, as shown, for example, in FIG. 1. Line mass 132 of each cell 122 may be calculated or approximated, for example, based upon the assigned density value for the cell and the volume of the cell. The gravity effect of each line mass may be calculated or approximated with reference to each gravity station 124 by reference to equation (2). The gravity effect of each line mass 132 is summed for each gravity station 124 to create recalculated gravity response 226.

At step 432, the computing system determines whether recalculated gravity response 226 matches sufficiently well with the observed gravity anomaly 110. The degree of match may be computed quantitatively. If sufficient match is found, the computing system may export the final data. If sufficient match is not found, another density change command may be implemented.

At step 434, the final density values may be exported. The display may be a two dimensional representation of the density values of cells 122 intersected by the cross section 102. The display may be coded with updated density values 212, as shown, for example, in strata 114, 116, and 118, and intrusion 120 in FIG. 2. The display may show the boundaries of cells 122, as in FIGS. 1 and 2. The computing system may identify a subsurface feature. A subsurface feature may be identified by, for example, searching for discontinuities in updated density values 212 between cells 122, as shown, for example, between strata 114, 116, and 118, and intrusion 120 in FIGS. 1, and 2. Identification of a subsurface feature may be accomplished quantitatively by use of a computing system 306.

Additionally, modifications, additions, or omissions may be made to method 400 without departing from the scope of the present disclosure. For example, the order of the steps may be performed in a different manner than that described and some steps may be performed at the same time. Additionally, each individual step may include additional steps without departing from the scope of the present disclosure.

Although the present disclosure and its advantages have been described in detail, it should be understood that various changes, substitutions and alterations can be made herein without departing from the spirit and scope of the disclosure as defined by the following claims.

The invention claimed is:

1. A method for generating a density model of a subsurface formation, the method comprising:
receiving observed gravity data acquired over the subsurface formation;
defining polygonal bodies in a cross section, based on subsurface geophysical information;
generating an overlay of cells for cross section wherein each cell pertains to one and only one of the polygonal bodies;
assigning a density value to each cell, wherein one of the polygonal bodies with variable density includes plural cells, at least two of these plural cells having assigned different density values;
calculating a gravity effect for each cell using the assigned density value thereof;
recording the gravity effect for each cell in a data structure;
comparing a gravity response calculated based on the gravity effect of each cell with the observed gravity data; and
if a difference between the gravity response and the observed gravity data is larger than a predetermined threshold, altering the density value assigned to one or more cells in the cross section,
wherein changes in density values reveals geological changes in the subsurface formation.

2. The method of claim 1, further comprising:
receiving a command to alter density values in a region of the cross section, the command including a density change for the region;
identifying one or more cells in the region based on the received command;
determining new density values for the identified one or more cells based upon the density change;
determining a new gravity effect for the identified one or more cells using the new density values; and
recording the new gravity effect for the identified one or more cells in the data structure.

3. The method of claim 2, further comprising:
re-calculating the gravity response; and
comparing the gravity response as re-calculated with the observed gravity data.

4. The method of claim 3, wherein the command is triggered by the difference between the gravity response and the observed gravity data being larger than the predetermined threshold, and the density values in the region or other density values in another region are altered until the difference becomes smaller than or equal to the predetermined threshold.

5. The method of claim 2, wherein the command indicates changing shape of one of the polygonal bodies.

6. The method of claim 1, wherein the cross section is vertically beneath a profile including locations where the observed gravity data has been acquired.

7. The method of claim 1, wherein:
the cross section comprises a two dimensional region substantially perpendicular to the surface of the earth beneath a selected profile; and
the selected profile is a straight line.

8. A method for generating a density model of a subsurface formation, the method comprising:
receiving gravity data acquired over the subsurface formation;
defining polygonal bodies in a cross section, based on subsurface geophysical information of the subsurface formation;
generating an overlay of cells for the cross section wherein each cell pertains to one and only one of the polygonal bodies;
assigning a density value to each cell, wherein one of the polygonal bodies with variable density includes plural cells, at least two of the plural cells having assigned different density values;
approximating a line mass for each cell based upon the density value and a size of the cell;
determining a gravity effect for each cell based on the line mass;
comparing a gravity response calculated based on the gravity effect of each cell with the gravity data; and
if a difference between the calculated gravity response and the observed gravity data is larger than a predetermined threshold, altering the density value of one or more cells,
wherein changes in density values reveals geological changes in the subsurface formation.

9. The method of claim 8, further comprising:
receiving a command to alter the density value of a region of the cross section, the command including a density change for the region;
identifying one or more cells in the region based on the received command;
determining a new density value for the identified one or more cells based upon the density change;
approximating a new line mass for the identified one or more cells based upon the new density value and size of the identified one or more cells; and
determining a new gravity effect for the identified one or more cells based upon the new line mass.

10. The method of claim 9, further comprising:
re-calculating the gravity response; and
comparing the gravity response as re-calculated with the gravity data.

11. The method of claim 10, wherein the command is triggered by a difference between the calculated gravity response and the gravity data larger than a predetermined threshold, and the density values in the region or other density values in another region are altered until the difference becomes smaller than or equal to the predetermined threshold.

12. The method of claim 8, wherein at least one cell comprises a rectangular shape.

13. A modeling system for generating a density model of a subsurface formation, the modeling system comprising a computing system configured to:
receive observed gravity data acquired over the subsurface formation;
define polygonal bodies in a cross section, based on subsurface geophysical information;
generate an overlay of cells for the cross section wherein each cell pertains to one and only one of the polygonal bodies;
assign a density value to each cell, wherein one of the polygonal bodies with variable density includes plural cells, at least two of these plural cells having assigned different density values;

calculate a gravity effect of each cell based upon the assigned density value thereof;

record the gravity effect of each cell in a data structure;

compare a gravity response calculated based on the gravity effect of each cell with the observed gravity data; and if a difference between the gravity response and the observed gravity data is larger than a predetermined threshold, alter the density value assigned to one or more cells, wherein changes in density values reveals geological changes in the subsurface formation.

14. The system of claim 13, wherein the computing system is further configured to:

receive a command to alter the density value of a region of the cross section, the command including a density change for the region;

identify one or more cells in the region based on the received command;

determine a new density value for the identified one or more cells based upon the density change;

determine a new gravity effect for the identified one or more cells based upon the new density value; and record the new gravity effect of the identified one or more cells in the data structure.

15. The system of claim 14, wherein the computing system is further configured to receive a second command to alter the density value of a second region of the cross section, the second command including a second density change for the second region;

identify a cell in the second region based on the second received command;

determine a new density value for the identified cell based upon the second density change;

approximate a line mass of the identified cell based upon the new density value and the size of the identified cell; and determine a new gravity effect for the identified cell based upon the line mass.

16. The system of claim 14, wherein the command indicates changing shape of one of the polygonal bodies.

17. The system of claim 14, wherein the computing system is further configured to re-calculate the gravity response and compare the gravity response as re-calculated with the observed gravity data.

18. The system of claim 17, wherein the command is triggered by the difference between the calculated gravity response and the observed gravity data being larger than the predetermined threshold, and the density is altered in the region or other region until the difference becomes smaller than or equal to the predetermined threshold.

19. The system of claim 13, wherein the computing system is further configured to identify one or more geological features based on the density value of each cell.

20. The system of claim 13, wherein the cross section is vertically beneath a profile including locations where the observed gravity data has been acquired.

* * * * *